(12) United States Patent
Bliley et al.

(10) Patent No.: US 6,543,007 B1
(45) Date of Patent: Apr. 1, 2003

(54) PROCESS AND SYSTEM FOR CONFIGURING REPAIR CODES FOR DIAGNOSTICS OF MACHINE MALFUNCTIONS

(75) Inventors: Richard Gerald Bliley, Erie, PA (US); David Richard Gibson, North East, PA (US)

(73) Assignee: General Electric Company

( * ) Notice: Subject to any disclaimer, the term of this patent is extended or adjusted under 35 U.S.C. 154(b) by 0 days.

(21) Appl. No.: 09/443,734

(22) Filed: Nov. 19, 1999

Related U.S. Application Data
(60) Provisional application No. 60/162,298, filed on Oct. 28, 1999.

(51) Int. Cl.[7] ............................................. H04L 1/22
(52) U.S. Cl. ............................................. 714/26; 701/29
(58) Field of Search .................... 714/26, 27, 30, 714/32, 38, 47, 52, 57; 705/1, 400; 701/29, 35; 707/104, 500

(56) References Cited

U.S. PATENT DOCUMENTS

| | | | |
|---|---|---|---|
| 4,270,174 A | 5/1981 | Karlin et al. | |
| 4,463,418 A | 7/1984 | O'Quin, II et al. | |
| 4,517,468 A | 5/1985 | Kemper et al. | |
| 4,695,946 A | 9/1987 | Andreasen et al. | |
| 4,823,914 A | 4/1989 | McKinney et al. | |
| 4,970,725 A | 11/1990 | McEnroe et al. | |
| 4,977,390 A | 12/1990 | Saylor et al. | |
| 5,113,489 A | 5/1992 | Cihiwsky et al. | |
| 5,123,017 A | 6/1992 | Simpkins et al. | |
| 5,157,610 A | 10/1992 | Asano et al. | |
| 5,274,572 A | 12/1993 | O'Neill et al. | |
| 5,282,127 A | 1/1994 | Mii | |
| 5,321,837 A | 6/1994 | Daniel et al. | |
| 5,329,465 A | 7/1994 | Arcella et al. | |

(List continued on next page.)

OTHER PUBLICATIONS

Data–Tronic Gas Turbine Information And Control System; General Electric Gas Turbine Reference Library; 8 pgs.

*Primary Examiner*—Nadeem Iqbal
(74) *Attorney, Agent, or Firm*—Carl A Rowold, Esq.; Enrique J. Mora, Esq.; Beusse, Brownlee, Bowdoin & Wolter, P.A.

(57) ABSTRACT

A process and system for populating a database of repair codes used by respective diagnostic tools to identify repairs of respective machines is provided. The process allows for collecting a list of available repair codes. The process further allows for executing expert analysis upon the collected list so as to determine compatibility of the respective repair codes with the diagnostic tools. A customizing step allows for customizing the list of repair codes based upon the executed expert analysis, and a storing step allows for storing the customized list of repair codes in the database of repair codes.

21 Claims, 10 Drawing Sheets

U.S. PATENT DOCUMENTS

| | | | |
|---|---|---|---|
| 5,400,018 A | 3/1995 | Scholl et al. | |
| 5,406,502 A | 4/1995 | Haramaty et al. | |
| 5,445,347 A | 8/1995 | Ng | |
| 5,463,768 A | 10/1995 | Cuddihy et al. | |
| 5,508,941 A | 4/1996 | Leplingard et al. | |
| 5,521,842 A * | 5/1996 | Yamada | 364/514 |
| 5,528,516 A | 6/1996 | Yemini et al. | |
| 5,566,091 A | 10/1996 | Schricker et al. | |
| 5,594,663 A | 1/1997 | Messaros et al. | |
| 5,633,628 A | 5/1997 | Denny et al. | |
| 5,638,296 A | 6/1997 | Johnson et al. | |
| 5,661,668 A | 8/1997 | Yemini et al. | |
| 5,666,534 A | 9/1997 | Gilbert et al. | |
| 5,678,002 A | 10/1997 | Fawcett et al. | |
| 5,712,972 A * | 1/1998 | Kakkar | 395/183.02 |
| 5,742,915 A | 4/1998 | Stafford | |
| 5,815,071 A | 9/1998 | Doyle | |
| 5,845,272 A | 12/1998 | Morjaria et al. | |
| 5,916,286 A * | 6/1999 | Seashore et al. | 701/29 |
| 5,950,147 A | 9/1999 | Sarangapani et al. | |
| 6,031,621 A * | 2/2000 | Binder | 358/1.1 |
| 6,067,410 A * | 5/2000 | Nachenberg | 395/500.49 |
| 6,175,934 B1 | 1/2001 | Hershey et al. | |
| 6,216,066 B1 | 4/2001 | Goebel et al. | |
| 6,243,628 B1 | 6/2001 | Bliley et al. | |
| 6,263,322 B1 * | 7/2001 | Kirkevold et al. | 705/400 |
| 6,301,531 B1 | 10/2001 | Pierro et al. | |
| 6,336,065 B1 * | 1/2002 | Gibson et al. | 701/29 |
| 6,343,236 B1 * | 1/2002 | Gibson et al. | 700/79 |
| 6,345,257 B1 * | 2/2002 | Jerrett | 705/1 |
| 6,415,395 B1 * | 7/2002 | Varma et al. | 714/37 |

\* cited by examiner

| CUST | UNIT | DATE | CODE | DESC | DESC1 |
|---|---|---|---|---|---|
| RR | 3500 | Sun Jul 13 1997 | 1111 | Piping Fittings-Engine Intercooler | REPAIRED WATER LEAK AT TOP OF RT |
| RR | 3500 | Tue Jul 01 1997 | 2222 | Lube Oil-Engine | WATER IN LUBE OIL CHANGED OIL |
| RR | 3500 | Sat Jun 28 1997 | 3333 | BRP-Battery Charger Regulator Panel | NO BATTCHARGE-REPL BPR |
| RR | 3500 | Wed Jun 18 1997 | 4444 | EFI-High Pressure Pump | REPLACE 3 HP PUMPS NOT FOR FIRING |
| RR | 3500 | Mon Jun 09 1997 | 5555 | Turbocharger Assembly-General-Eng | TURBO DRAGSSECONDARY DAMAGE-RPL |
| RR | 3500 | Sat May 24 1997 | 6666 | Cylinder Assembly General-Eng | REPL R6 PA FOR SECONDARY DAMAGE |
| RR | 3500 | Sat May 24 1997 | 7777 | Cylinder Assembly General-Eng | TRIPPING COP PISTON FAILURE CO |

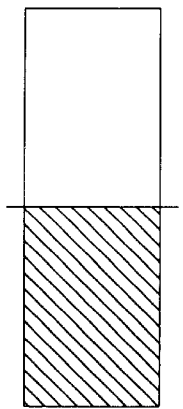

Fig. 2A

| FAILMODE_DESC | SUB_ASSEMBLY_CODE | MAIN_ASSEMBLY_CODE |
|---|---|---|
| LEAKING FLUIDAIR | ENGINTCOOL | ENGINE |
| CONTAMINATED | LUBEOIL | ENGISUPT |
| UNKNOWNUNDETERMINED | POWERPANEL | POWERELN |
| UNKNOWNUNDETERMINED | ENGFUELINJ | ENGINE |
| UNKNOWNUNDETERMINED | ENGTURBO | ENGINE |
| UNKNOWNUNDETERMINED | POWERASSY | ENGINE |
| UNKNOWNUNDETERMINED | POWERASSY | ENGINE |

Table 30

```
 0  1   2    0 101  97 R E 0 0 ———— Intake Manifold Air Too
 0  1   2    0 101  97 R E 0 0 ———— Intake Manifold Air Too
992 288 4706 202 177 182 M E F 0 6AB_M_S  COP Trip
992 288 4706 202 177 182 M E F 0 6AB_M_S  COP Trip
885 338 2864 133 175 186 M E 2 4 6AB_M_S  COP Trip
885 338 2864 133 175 186 M E 2 4 6AB_M_S  COP Trip
458   6    0   0 174 186 R E F 4 EAB      Fault Reset While in Lc
458   6    0   0 174 186 R E F 4 EAB      Fault Reset While in Lc
992 474 3005 148 180 187 M E 2 0 R 6AB_M_S COP Trip
992 474 3005 148 180 187 M E 2 0 R 6AB_M_S COP Trip
1010 506 2405 128 179 189 M E F 4 6AB_M_S  COP Trip
```

| 35 REPAIR CODE | 36 DESCRIPTION | 38 SUBSYSTEM CODE | 39 ASSEMBLY CODE | 40 SUBASSEMBLY CODE |
|---|---|---|---|---|
| 1404 | ALTERNATOR BLOWER OVERLOAD | EQUIP. VENT | ROT. | ALT. |
| ... | ... | ... | ... | ... |
| 1619 | DB1A− | TRACTION | EMDB & CONT | CONTACTOR |
| 1620 | DB1A+ | " | " | " |
| 1621 | DB1B− | " | " | " |
| 1622 | DB1B+ | " | " | " |
| ... | ... | ... | ... | ... |
| 2410 | WATER PIPE | ENG COOLING | PIPE & WIRING | WATER PIPE |
| ... | ... | ... | ... | ... |
| 4000 | JOURNAL BEARINGS | TRUCK | TRK & PLAT | TRUCK |

PROCESS AND SYSTEM FOR CONFIGURING REPAIR CODES FOR DIAGNOSTICS OF MACHINE MALFUNCTIONS

This application claims the benefit of U.S. Provisional Application No. 60/162,298 filed Oct. 28, 1999.

BACKGROUND OF THE INVENTION

The present invention relates generally to machine diagnostics, and more specifically, to a system and method for configuring repair codes for diagnostics of machine malfunctions.

A machine, such as a locomotive or other complex systems used in industrial processes, medical imaging, telecommunications, aerospace applications, power generation, etc., includes elaborate controls and sensors that generate faults when anomalous operating conditions of the machine are encountered. Typically, a field engineer will look at a fault log and determine whether a repair is necessary.

Approaches like neural networks, decision trees, etc., have been employed to learn over input data to provide prediction, classification, and function approximation capabilities in the context of diagnostics. Often, such approaches have required structured and relatively static and complete input data sets for learning, and have produced models that resist real-world interpretation.

Another approach, Case Based Reasoning (CBR), is based on the observation that experiential knowledge (memory of past experiences—or cases) is applicable to problem solving as learning rules or behaviors. CBR relies on relatively little pre-processing of raw knowledge, focusing instead on indexing, retrieval, reuse, and archival of cases. In the diagnostic context, a case refers to a problem/solution description pair that represents a diagnosis of a problem and an appropriate repair.

CBR assumes cases described by a fixed, known number of descriptive attributes. Conventional CBR systems assume a corpus of fully valid or "gold standard" cases that new incoming cases can be matched against.

U.S. Pat. No. 5,463,768 discloses an approach which uses error log data and assumes predefined cases with each case associating an input error log to a verified, unique diagnosis of a problem. In particular, a plurality of historical error logs are grouped into case sets of common malfunctions. From the group of case sets, common patterns, i.e., consecutive rows or strings of data, are labeled as a block. Blocks are used to characterize fault contribution for new error logs that are received in a diagnostic unit. Unfortunately, for a continuous fault code stream where any or all possible fault codes may occur from zero to any finite number of times and where the fault codes may occur in any order, predefining the structure of a case is nearly impossible.

U.S. Pat. No. 6,343,236, assigned to the same assignee of the present invention and herein incorporated by reference, discloses a system and method for processing historical repair data and fault log data, which is not restricted to sequential occurrences of fault log entries and which provides weighted repair and distinct fault cluster combinations, to facilitate analysis of new fault log data from a malfunctioning machine. Further, U.S. Pat. No. 6,415,395, assigned to the same assignee of the present invention and herein incorporated by reference, discloses a system and method for analyzing new fault log data from a malfunctioning machine in which the system and method are not restricted to sequential occurrences of fault log entries, and wherein the system and method predict one or more repair actions using predetermined weighted repair and distinct fault cluster combinations.

Further, U.S. Pat. No. 6,336,065, titled, "A Method and System for Analyzing Fault and Snapshot Operational Parameter Data For Diagnostics of Machine Malfunctions", and assigned to the same assignee of the present invention and herein incorporated by reference, discloses a system and method that uses snapshot observations of operational parameters from the machine in combination with the fault log data in order to further enhance the predictive accuracy of the diagnostic algorithms used therein. In each of the foregoing approaches, it would be desirable to have accurate and reliable output and/or feedback to the diagnostic tools for machine repairs and/or handling of replaceable components by using repair codes configured to accurately and unambiguously address each respective predicted repair. Thus, it would be desirable to have repair codes configured to precisely and accurately pinpoint to respective components and/or repairs notwithstanding that the machine may have hundreds or even thousands of components, some of them substantially interrelated to one another. It would be further desirable to systematically maintain a database wherein the repair codes are kept substantially up to date notwithstanding deployment of new models and/or configurations either in the diagnostic tools and/or the machine.

BRIEF SUMMARY OF THE INVENTION

Generally speaking, the present invention fulfills the foregoing needs by providing a process for populating a database of repair codes used by respective diagnostic tools to identify repairs of respective machines, the process allows for collecting a list of available repair codes. The process further allows for executing expert analysis upon the collected list so as to determine compatibility of the respective repair codes therein with the diagnostic tools. A customizing step allows for customizing the list of repair codes based upon the executed expert analysis, and a storing step allows for storing the customized list of repair codes in the database of repair codes.

The present invention further fulfills the foregoing needs by providing a system for populating a database of repair codes used by respective diagnostic tools to identify repairs of respective machines. The system includes means for collecting a list of available repair codes. The system further includes means for executing expert analysis upon the collected list so as to determine compatibility of the respective repair codes therein with the diagnostic tools. Customizing means is provided to customize the list of repair codes based upon the executed expert analysis, and storing means allow to store the customized list of repair codes in the database of repair codes.

BRIEF DESCRIPTION OF THE DRAWINGS

The features and advantages of the present invention will become apparent from the following detailed description of the invention when read with the accompanying drawings in which:

FIG. 6 is a listing containing exemplary repair codes generated using the flow charts of FIGS. 4 and 5.

DETAILED DESCRIPTION OF THE INVENTION

Figure 1:
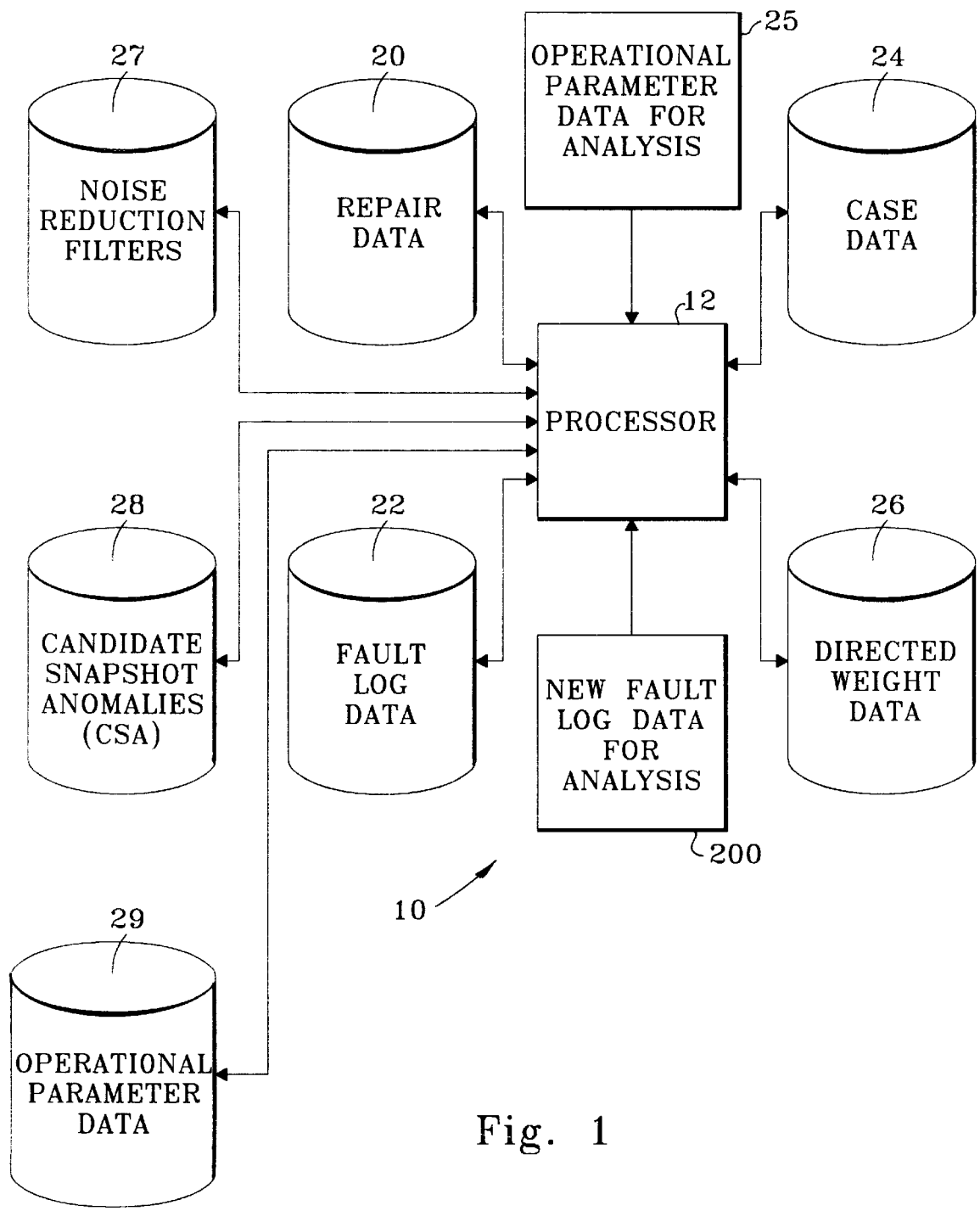
FIG. 1 is a block diagram of an exemplary system that may readily benefit from the teachings of the present invention and uses a processor for processing operational parameter data and fault log data from one or more machines and for diagnosing a malfunctioning machine.

FIG. 1 diagrammatically illustrates one example of a diagnostic system 10 that may readily benefit from the teachings of the present invention. System 10 provides a process for automatically harvesting or mining repair data comprising a plurality of related and unrelated repairs and fault log data comprising a plurality of faults, from one or more machines such as locomotives, and generating weighted repair and distinct fault cluster combinations which are diagnostically significant predictors to facilitate analysis of new fault log data from a malfunctioning locomotive. It will be appreciated that system 10 may allow for hybridly analyzing the fault log data jointly with operational parameters from the machine.

Although the present invention is described with reference to a locomotive, system 10 can be used in conjunction with any machine in which operation of the machine is monitored, such as a chemical, an electronic, a mechanical, or a microprocessor machine.

Exemplary system 10 includes a processor 12 such as a computer (e.g., UNIX workstation) having a hard drive, input devices such as a keyboard, a mouse, magnetic storage media (e.g., tape cartridges or disks), optical storage media (e.g., CD-ROMs), and output devices such as a display and a printer. Processor 12 is operably connected to and processes data contained in a repair data storage unit 20 and a fault log data storage unit 22. Processor 12 is further respectively connected to and processes noise-reduction filters stored in a storage unit 27, and candidate snapshot anomalies stored in a storage unit 28.

Figure 2B:
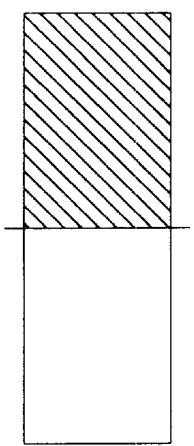
FIG. 2 is an illustration of exemplary repair log data that may be categorized using the repairs codes configured with the process of the present invention.

Repair data storage unit 20 includes repair data or records regarding a plurality of related and unrelated repairs for one or more locomotives. FIG. 2 shows an exemplary portion 30 of the repair data contained in repair data storage unit 20. The repair data may include a customer identification number 32, a locomotive identification or unit number 33, the date 34 of the repair, the repair code 35, a repair code description 36, a description of the actual repair 37 performed, etc.

Figure 3A:
FIG. 3 is an illustration of exemplary fault log data.
Figure 3A:
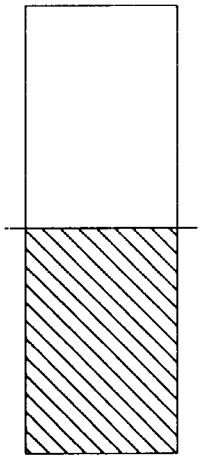
Figure 3B:
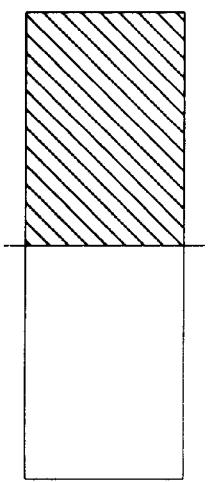

Fault log data storage unit 22 includes fault log data or records regarding a plurality of faults occurring prior to the repairs for the one or more locomotives. FIG. 3 shows an exemplary portion 40 of the fault log data contained in fault log data storage unit 22. The fault log data may include a customer identification number 42, a locomotive identification number or unit 44, the date 45 when the fault occurred, a fault code 46, a fault code description 48, etc.

As suggested above, additional data used in the analysis of the present invention include operational parameter data indicative of a plurality of operational parameters or operational conditions of the machine. The operational parameter data may be obtained from various sensor readings or observations, e.g., temperature sensor readings, pressure sensor readings, electrical sensor readings, engine power readings, etc. Examples of operational conditions of the machine may include whether the locomotive is operating in a motoring or in a dynamic braking mode of operation, whether any given subsystem in the locomotive is undergoing a self-test, whether the locomotive is stationary, whether the engine is operating under maximum load conditions, etc. It will be appreciated by those skilled in the art that the repair data storage unit, the fault log data storage unit, and the operational parameter data storage unit may respectively contain repair data, fault log data and operational parameter data for a plurality of different locomotives. It will be further appreciated that the operational parameter data may be made up of snapshot observations, i.e., substantially instantaneous readings or discrete samples of the respective values of the operational parameters from the locomotive. Preferably, the snapshot observations are temporally aligned relative to the time when respective faults are generated or logged in the locomotive. For example, the temporal alignment allows for determining the respective values of the operational parameters from the locomotive prior, during or after the logging of respective faults in the locomotive. The operational parameter data need not be limited to snapshot observations since substantially continuous observations over a predetermined period of time before or after a fault is logged can be similarly obtained. This feature may be particularly desirable if the system is configured for detection of trends that may be indicative of incipient failures in the locomotive.

As suggested above the present invention allows for developing, populating, and maintaining a database or table, for example a look-up table, for each repair code used by the diagnostic system. The repair codes are configured to be used regardless of the specific diagnostic technique used by the diagnostic system, e.g., CBR, Bayesian Belief Network (BBN), etc. Similarly, the output of the diagnostic tool is configured to provide respective repair predictions based on the repair codes found on the database. Generally, any feedback to the diagnostic tools, such as may be used for adaptive learning, is also based on the repair codes stored in the database.

Figure 4:
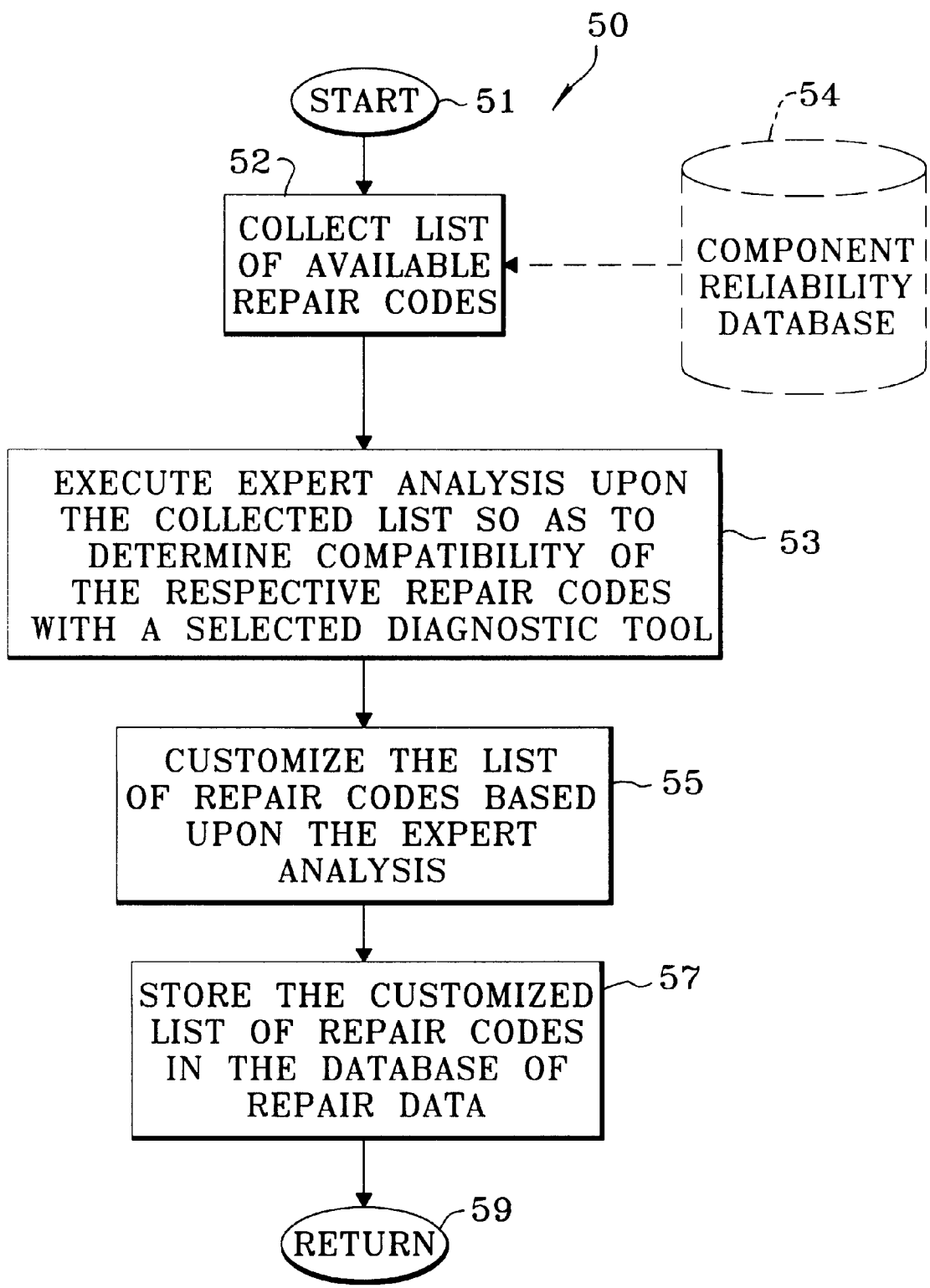
FIG. 4 is a flow chart of an exemplary embodiment of the process of the present invention for configuring repair codes that may be used for populating a database of repair data.

As suggested above, FIG. 4 illustrates a flow chart of an exemplary embodiment of a process 50 of the present invention for configuring repair codes that may be used for populating a database of repair data. As shown in the flowchart of FIG. 4, upon start of operations at step 51, step 52 allows for collecting a list of available repair codes. By way of example and not of limitation, the initial repair codes may be collected from a bucket or database 54 of externally derived codes generally configured for tracking reliability of components of the machine, or any other externally derived codes not necessarily configured for diagnostics. Step 53 allows for executing expert analysis upon the collected list so as to determine compatibility of the respective repair codes with a selected diagnostic tool. By way of example and not of limitation, the expert analysis may be performed by teams of experts who preferably have a reasonably thorough understanding of respective subsystems of the locomotive and their interaction with other subsystems of the locomotive. For example, one team may address repair codes for the traction subsystem of the locomotive. Another team may address repair codes for the engine cooling subsystem, etc. As suggested above, each of such teams may also interact with the diagnostics experts in order to insure that the newly configured repair codes are fully compatible with any of the diagnostics techniques used for running diagnostics on any given locomotive. As further discussed in the context of FIG. 5 below, step 55 allows for customizing the list of repair codes based upon the expert analysis conducted in step 53. Prior to return step 59, step 57 allows for storing the customized list of repair codes in the database of repair data.

Figure 5A:
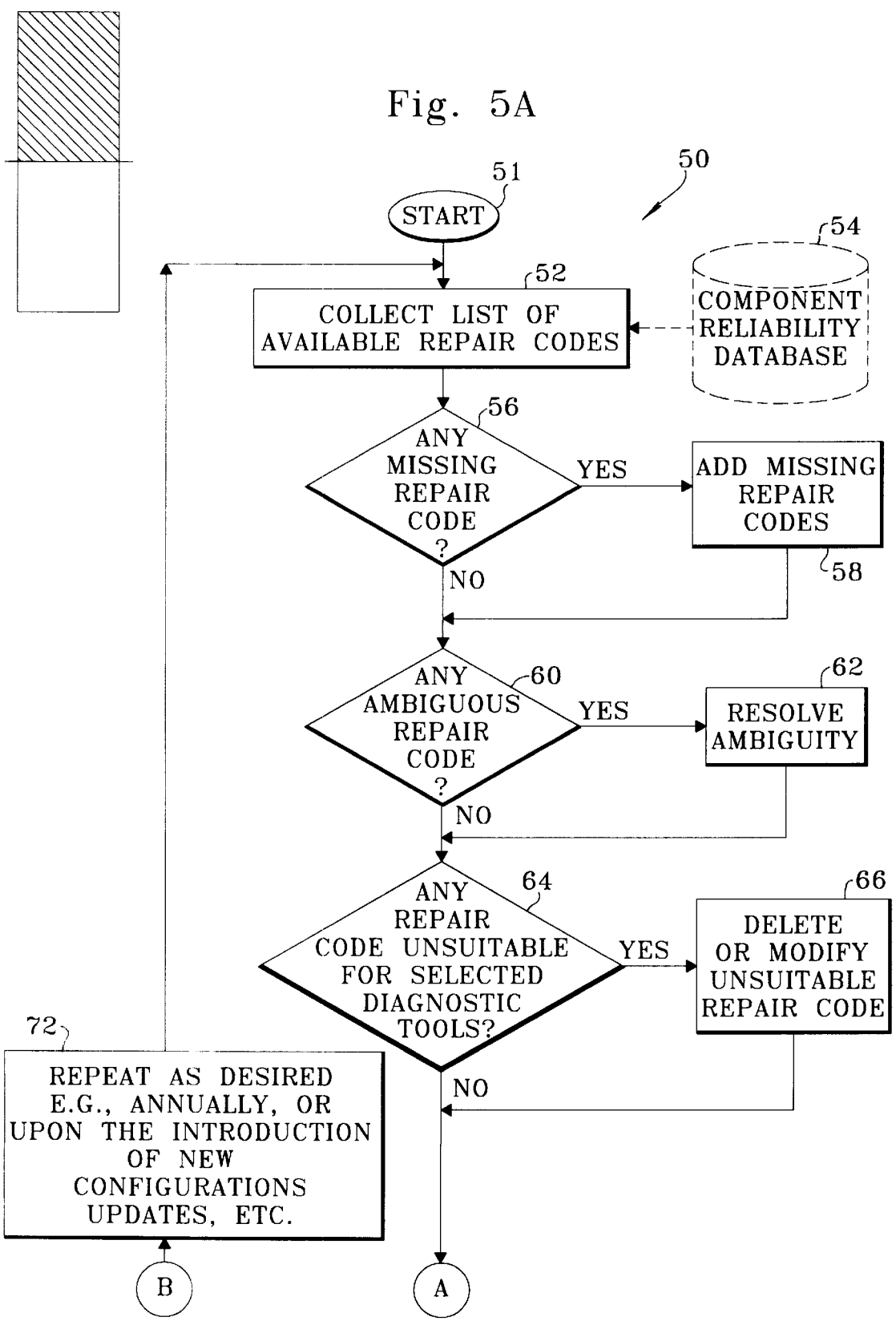
FIGS. 5A and 5B collectively make up a flow chart that illustrate further details in connection with the process of FIG. 4.
Figure 5B:
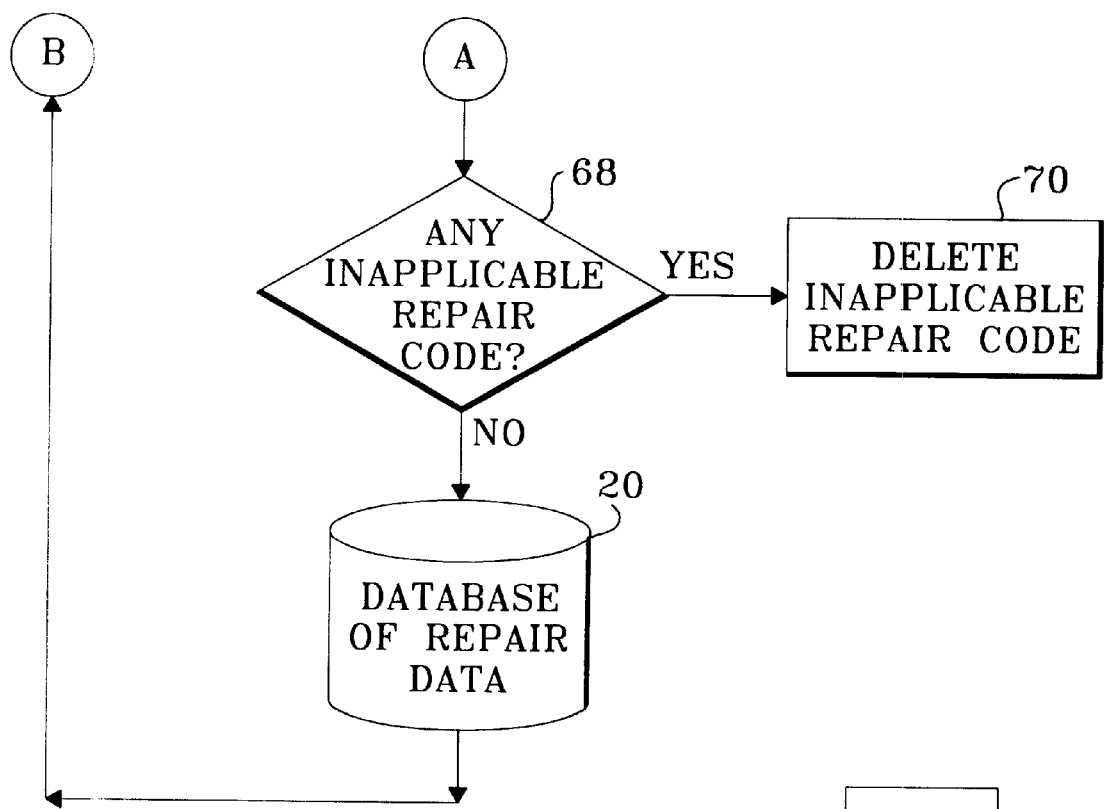

As shown in the flowchart of FIG. 5, made up of FIGS. 5A and 5B, upon start of operations at step 51, and as discussed above, step 52 allows for collecting the list of available repair codes. It will be appreciated that the expert analysis performed on the collected repair codes allows for conducting the process steps which are now discussed below. For example, a step 56 allows for determining if there are any missing repair codes. Step 58 allows for adding any such missing codes. Otherwise, step 60 allows for determining if there are ambiguous or imprecise repair codes. Step 62 allows for resolving any such ambiguity or lack of precision. Otherwise, step 64 allows for determining if there are any repair codes unsuitable for the respective diagnostic tools. Step 66 allows for deleting or modifying any such unsuitable repair codes. Otherwise, step 68 allows for determining if there are any inapplicable repair codes. Step 70 allows for deleting any such inapplicable repair codes. Otherwise, any remaining repair codes may be conveniently stored in the database 20 of repair data.

It will be appreciated that if desired, step 72 allows for repeating any new iterations of the process 50. For example, such new iterations may be performed at predetermined time intervals, e.g., annually, monthly, etc., and/or upon the occurrence of predetermined events, such as deployment of new locomotive configurations, updates, etc.

FIG. 6 shows an exemplary list or file of repair codes 35, including respective descriptions 36 and wherein respective repair codes are categorized at least based on a respective subsystem codes 38, assembly codes 39 and subassembly codes 40. It will be appreciated by those skilled in the art that the above categories are merely illustrative being that further categorizations would be readily achievable depending on the level of refinement desired for any given application.

Row 41 is an example of a repair code (e.g., repair code 1404) that may have been previously missing from the externally-derived bucket of codes but since a malfuinction condition described as alternator blower overload is now predictable by the diagnostic system, then that repair code was added to match the foregoing malfunction condition.

Rows 42 collectively represent an example that corrects a previously ambiguous or imprecise repair code, (not shown). For example, the previous code may have simply indicated that there was a control line failure, for example, in the dynamic braking subsystem of the locomotive. However, such repair code may not have been particularly helpful if, for example, there were four control lines in that subsystem. In that case, respective repair codes 1619 through 1622 collectively pinpoint the precise control line being affected due to a respective contactor failure.

Row 43 is an example of a repair code (e.g., repair code 2410) that may be unsuitable for any of the diagnostics tools. In this exemplary case, let us presume that there are a plurality of pipes that carry water to the engine. Let us further assume that the diagnostic tool is not conditioned to pinpoint whether any specific pipe has failed. Thus, in this case having a respective repair code for any of such pipes would be of little value and any such repair code should be deleted. Similarly, row 44 illustrates an example of an inapplicable repair code. For example, presuming that degradation of journal bearings in a truck of a locomotive is not conducive to be readily predicted by any of the diagnostic tools, then having a repair code for such a condition would also be of little value and any such repair code should be deleted.

Figure 7:
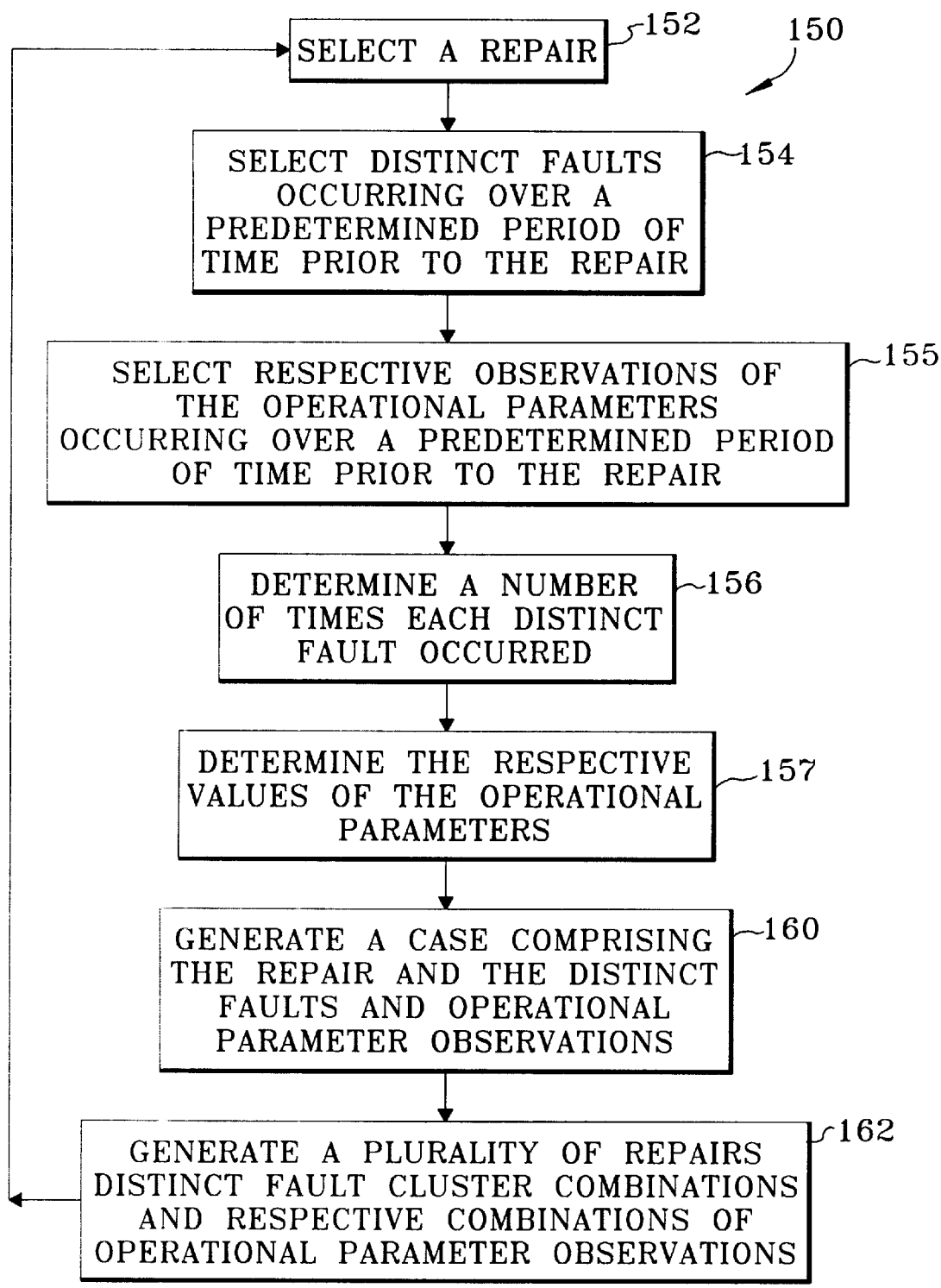
FIG. 7 is a flow chart describing steps for generating a plurality of cases, including predetermined repairs that may be accurately and precisely identified with the repair codes of the present invention, and further including fault cluster combinations and operational parameter observations for each case.

FIG. 7 is a flowchart of an exemplary process 150 of the present invention for selecting or extracting repair data from repair data storage unit 20, fault log data from fault log data storage unit 22, and operational parameter data from operational parameter data storage unit 29 and generating a plurality of diagnostic cases, which are stored in a case storage unit 24. As used herein, the term "case" comprises a repair and one or more distinct faults or fault codes in combination with respective observations of one or more operational parameters.

With reference still to FIG. 7, process 150 comprises, at 152, selecting or extracting a repair from repair data storage unit 20 (FIG. 1). Given the identification of a repair, the present invention searches fault log data storage unit 22 (FIG. 1) to select or extract, at 154, distinct faults occurring over a predetermined period of time prior to the repair. Similarly, operational parameter data storage unit 29 (FIG. 1) may be searched to select or extract, at 155, respective observations of the operational parameter data occurring over a predetermined period of time prior to the repair. Once again, the observations may include snapshot observations, or may include substantially continuous observations that would allow for detecting trends that may develop over time in the operational parameter data and that may be indicative of malfunctions in the machine. The predetermined period of time may extend from a predetermined date prior to the repair to the date of the repair. Desirably, the period of time extends from prior to the repair, e.g., 14 days, to the date of the repair. It will be appreciated that other suitable time periods may be chosen. The same period of time may be chosen for generating all of the cases.

At 156, the number of times each distinct fault occurred during the predetermined period of time is determined. At 157, the respective values of the observations of the operational parameters is determined. A plurality of repairs, one or more distinct fault cluster and respective observations of the operational parameters are generated and stored as a case, at 160. For each case, a plurality of repair, respective fault cluster combinations, and respective combinations of clusters of observations of the operational parameters is generated at 162.

In addition, when initially setting up case data storage unit 24, a field engineer may review each of the plurality of cases to determine whether the collected data, either fault log data and/or operational parameter data, provide a good indication of the repair. If not, one or more cases can be excluded or removed from case data storage unit 24. This review by a field engineer would increase the initial accuracy of the system in assigning weights to the repair, candidate snapshot malfunctions and fault cluster combinations.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A process for developing, populating and maintaining a database of repair codes each configured for use with a plurality of diagnostic tools used to identify repairs needed on respective machines, the process comprising:

a) identifying and collecting a plurality of available repair codes;

b) executing expert analysis upon the available repair codes so as to determine the compatibility of each repair code therein with the diagnostic tools;

c) customizing the repair codes based upon the executed expert analysis so as to make them compatible with the diagnostic tools; and d) storing the customized repair codes in the database of repair codes for later use in diagnosing machines to be repaired with the diagnostic tools.

2. The process of claim 1 wherein the customizing step comprises adding any missing repair codes to the database of repair codes.

3. The process of claim 1 wherein the customizing step comprises resolving any diagnostics ambiguities, if any, in respective ones of the repair codes.

4. The process of claim 1 wherein the customizing step comprises deleting or modifying any repairs codes unsuitable for the diagnostic tools.

5. The process of claim 1 wherein the customizing step comprises deleting any inapplicable repair codes.

6. The process of claim 1 further comprising a step of executing new iterations of steps a) through d) at predetermined intervals so as to maintain the database of repair codes substantially up to date.

7. The process of claim 1 further comprising a step of executing new iterations of steps a) through d) upon deployment of configuration changes and/or new models of the machine.

8. The process of claim 1 wherein the respective machines comprise a fleet of locomotives.

9. The process of claim 1 wherein the database of repair codes comprises respective repair codes for respective subsystems of the locomotive.

10. The process of claim 1 wherein the customizing step comprises:

adding any missing repair codes to the list of repair codes;

resolving any diagnostic ambiguities in respective ones of the repair codes; and deleting any repair codes indicative of repairs unsuitable and/or inapplicable for the diagnostics tools.

11. A system for developing, populating and maintaining a database of repair codes each configured for use with a plurality of diagnostic tools used to identify repairs needed on respective machines, the system comprising:

means for identifying and collecting a plurality of available repair codes;

means for executing expert analysis upon the available repair codes so as to determine compatibility of each repair code therein with the diagnostic tools;

means for customizing the repair codes based upon the executed expert analysis to make them compatible with the diagnostic tools; and means for storing the customized repair codes in the database of repair codes for later use in diagnosing machines to be repaired with the diagnostic tools.

12. The system of claim 11 further comprising means for adding any missing repair codes to the database of repair codes.

13. The system of claim 11 further comprising mean for resolving any diagnostics ambiguities, if any, in respective ones of the repair codes.

14. The system of claim 11 further comprising means for deleting or modifying any repairs codes unsuitable for the diagnostic tools.

15. The system of claim 11 further comprising means for deleting any inapplicable repair codes.

16. The system of claim 11 further means for executing new iterations at predetermined intervals so as to maintain the database of repair codes substantially up to date.

17. The system of claim 11 further comprising means for executing new iterations upon deployment of configuration changes and/or new models of the machine.

18. The system of claim 11 wherein the respective machines comprise a fleet of locomotives.

19. The system of claim 11 wherein the database of repair codes comprises respective repair codes for respective subsystems of the locomotive.

20. The system of claim 11 further comprising:

means for adding any missing repair codes to the database of repair codes;

means for resolving any diagnostic ambiguities in respective ones of the repair codes; and means for deleting any repair codes indicative of repairs unsuitable and/or inapplicable for the diagnostic tools.

21. A system for developing, populating and maintaining a database of repair codes each configured for use with a plurality of diagnostic tools used to identify repairs needed on respective machines, the system comprising:

a database configured to identify and collect a plurality of available repair codes;

a processor configured to perform expert analysis upon the available repair codes so as to determine compatibility of each repair code therein with the diagnostic tools; and a processor configured to customize the repair codes based upon the executed expert analysis to make them compatible with the diagnostic tools, wherein the database is further configured to store the customized repair codes for later use in diagnosing machines to be repaired with the diagnostic tools.

* * * * *